UNITED STATES PATENT OFFICE.

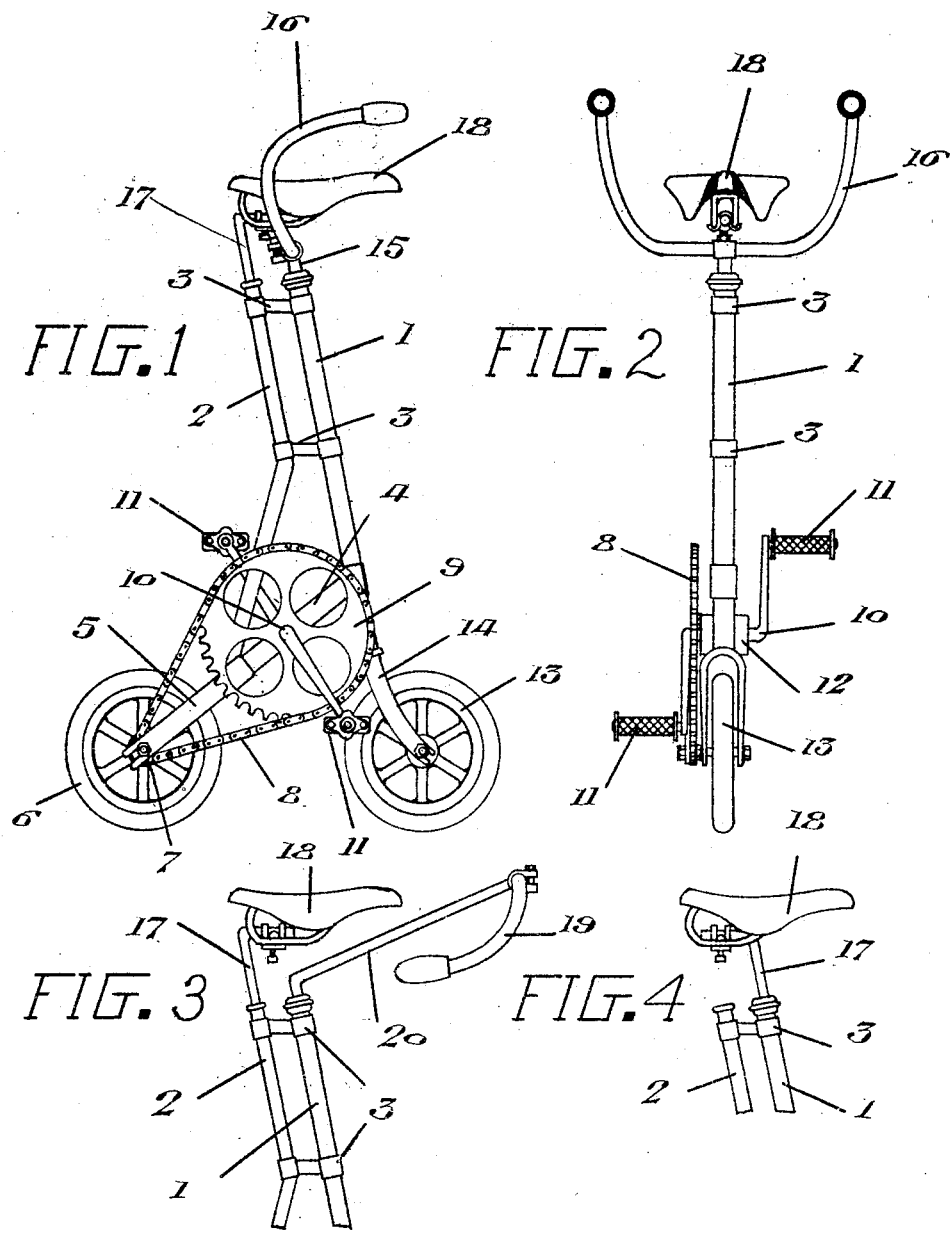

CHARLES HASKELL CLARK, OF NEW YORK, N. Y.

BICYCLE.

1,381,281.

Specification of Letters Patent. Patented June 14, 1921.

Application filed December 4, 1919. Serial No. 342,379.

*To all whom it may concern:*

Be it known that I, CHARLES H. CLARK, a citizen of the United States, residing at New York, in the county of New York and State of New York, have invented certain new and useful Improvements in Bicycles, of which the following is a specification.

The present invention relates to bicycles.

The standard types of bicycles now in use have front and rear wheels of considerable diameter connected by a frame of considerable length, giving a long wheel base. As now manufactured, a special frame is required for a woman, because the top bar of the diamond frame of a man's bicycle would interfere with her skirts and prevent her from either mounting or riding. The space required for handling the present bicycle makes it impossible to carry it through revolving doors or conveniently into trains, street cars, or any place where the room is restricted or where there are a considerable number of people moving about. And on crowded thoroughfares where the traffic is heavy it is very difficult to make quick or sharp turns as are necessary in dodging in and out among the crowd, and especially difficult to dismount quickly in case of necessity. Also in carrying the present bicycle both hands must be used, especially where there is any appreciable traffic. Again, in the present standard bicycle there is no means provided for steering the bicycle except by hand, so that the rider, at most, has but one hand free for carrying parcels or other uses. Necessarily with the large diameter wheels and considerable length of frame the present standard bicycle is of considerable weight, which is a big handicap when it must be carried any appreciable distance.

The main purpose of the present invention is to provide a simple, inexpensive, and very compact bicycle with small diameter wheels, and one which may be used, without change, both as a man's and as a woman's bicycle, while also providing a bicycle which will completely avoid all of the objections above indicated.

In the drawings:

Figure 1 is a side view of the invention.

Fig. 2 is a front view.

Fig. 3 is a side view of the upper part of the frame with handle bars for a man, and Fig. 4 is a similar view with the seat post mounted in the steering tread.

Instead of the usual diamond frame and drop frame of the present standard bicycles, a very short frame is provided, the longitudinal members being almost completely eliminated. It comprises the front tubular frame member 1, rear tubular frame member 2, a few inches therefrom and connected thereto by short metal straps, tube sections or other suitable means 3. From a point about midway of the height of the rear member to the lower end thereof the rear member diverges from the front member. The lower ends of the front and rear bars are connected by a diagonal frame member 4 which has a lower forked end 5 to receive the rear wheel 6 in the usual manner. The wheel 6 is driven in the usual way through sprocket and chain drive 7, 8, 9. The sprocket 9 is fixed to and driven by a crank 10 provided with pedals 11, and journaled in a suitable bearing 12 in the member 4. The front or steering wheel 13 is mounted in the usual way in the front fork 14 of the steering post, which is of usual construction and freely rotatable within the front frame member 1. It is adapted to be adjustably clamped or otherwise secured to either the post 15 of the handle bars 16 or the seat post 17 of seat 18. In Fig. 3 a slightly different mounting and type of handle bar is used. The handle bar 19 being carried well forward by a post 20 that runs off at an angle from the top of the steering head. This is, of course, especially for a man's bicycle. It will be noticed that the wheels are of small diameter, giving a very short compact wheel base and at the same time permitting the pedals to be mounted so that they will come very close to the road surface. This is a feature which makes it possible for the rider to instantly dismount in congested traffic or whenever desired. Also it will be noticed that the bicycle is geared relatively high so that, although the wheels are of small diameter, the speed will be fully maintained.

In Figs. 1 and 2 it will be noticed that the steering head is directly under the saddle and somewhat to the rear of the longitudinal center thereof. In this form it will be seen that the handle bars curve outwardly from the head, upwardly, and then forwardly. This arrangement enables a woman to use the same bicycle as a man without any change whatever. She simply mounts the saddle 18, sits on it between the handles 16, and her skirt falls freely in front of the front frame member 1, using the handles 16 for steering in the usual way. Or, if desired, the handle bar post 15 and seat post 17 may be interchanged and the steering done by the seat post through swaying of the body on the seat. In that case the handles 16 become practically hand rests or grips. Or the handles may be completely omitted, as in Fig. 4, and the bicycle steered by swaying the body, the hands being free for use in carrying parcels, if desired. This form would be particularly serviceable for delivery boys.

It will be noticed that the length of the frame in the direction of the wheel base from the front fork to the rear fork is very greatly reduced, even at the lower end, and almost eliminated from the bend of the member 2 upwardly.

It will be noticed that the wheel base may be so short that the rider actually sits directly above both wheels instead of above the rear one and at a distance to the rear of the front wheel. This and the very small diameter of the wheels put them entirely out of reach of the skirt of a woman rider, making a wheel guard unnecessary. The seat, itself, lies partly above both wheels, bridging the space between.

It is clear that many changes may be made in the construction and arrangement of various parts of the invention, and in the relative proportions thereof, as well as in the methods of manufacturing, without in any way departing from the field and scope of the same, and it is meant to include all such within this application wherein only several preferred forms have been shown for purposes of illustration.

Having thus described my invention, what I claim and desire to protect by Letters Patent is:

1. A bicycle comprising a permanent form rigid frame, two road wheels mounted therein, a shaft extending through said frame, means for driving said shaft, a drive wheel mounted on said shaft, and means interposed between said drive wheel and one of said road wheels to drive the latter, the said shaft being located at the normal and usual distance from a horizontal plane touching the lowermost points of the road wheels, the axis of each road wheel being located at a point not substantially exceeding one half of the distance between said shaft and the nearest point on said plane, and the distance between the said shaft and the nearest point on said plane being substantially two-thirds of the distance between the axes of said road wheels.

2. A bicycle comprising a permanent form rigid frame, two road wheels mounted therein, a shaft extending through said frame, means for driving said shaft, a drive wheel mounted on said shaft, and means interposed between said drive wheel and one of said road wheels to drive the latter, the said shaft being located at the normal and usual distance from a horizontal plane touching the lowermost points of the road wheels, the axis of each road wheel being located at a point not exceeding one half the distance between said shaft and the nearest point on said plane, and the distance between the said shaft and the nearest point on said plane being substantially the same as the distance between the axis of said shaft and the axis of each of said road wheels and not substantially exceeding two thirds of the distance between the axes of said road wheels.

3. A bicycle comprising a permanent form rigid frame, two road wheels mounted therein, a shaft extending through said frame, means for driving said shaft, a drive wheel mounted on said shaft, and means interposed between said drive wheel and one of said road wheels to drive the latter, the said shaft being located at the normal and usual distance from a horizontal plane touching the lowermost points of the road wheels, the axis of each road wheel being located at a point equal to substantially two-fifths of the distance between said shaft and the nearest point on said plane, and the distance between the said shaft and the nearest point on said plane being substantially equal to two-thirds the distance between the axes of said road wheels.

4. A bicycle comprising a rigid frame, two road wheels mounted therein, a shaft extending through said frame, means for driving said shaft, a drive wheel mounted on said shaft, and means interposed between said drive wheel and the rear road wheel to drive the latter, the said shaft being located at the normal and usual distance from a horizontal plane touching the lowermost points of the road wheels, the axis of each road wheel being located at a point not exceeding substantially one half of the distance between said shaft and the nearest point on said plane, the distance between the said shaft and the nearest point on said plane not substantially exceeding two-thirds of the distance between the axes of the road wheels, and the said frame comprising a substantially vertical tubular front frame member, in which are mounted and connected together for steering purposes, the front wheel fork and the handle-bar, a rear tubular member located closely adjacent to the front member and rigidly connected thereto by struts, and a lower member rigidly connected to the lower end of said rear member and to the front member adjacent the lower end thereof and terminating in a rearwardly presented fork to receive the rear wheel, the longitudinal central line of said lower member intersecting the axis of said rear wheel and the axis of said shaft.

5. A bicycle comprising a permanent form rigid frame, two road wheels mounted therein, a shaft extending through said frame, means for driving said shaft, a drive wheel mounted on said shaft, and means interposed between said drive wheel and one of said road wheels to drive the latter, the said shaft being located at the normal and usual distance from a horizontal plane touching the lowermost points of the road wheels, the axis of each road wheel being located at a point not exceeding substantially one half of the distance between said shaft and the nearest point on said plane, and the distance between the nearest point on said plane and said shaft being substantially two-thirds of the distance between the axes of the road wheels, and the said frame comprising a substantially vertical tubular front frame member, in which are mounted, and connected together for steering purposes, the front wheel fork and handle-bar, a rear tubular member located closely adjacent to the front member and rigidly connected thereto by struts, and a lower member rigidly connected to the lower portion of said rear member and to the front member adjacent the lower end thereof, but at a point farther from said plane than the point of connection to the rear member, the said lower member terminating in a rearwardly presented fork to receive the rear wheel and also serving as a support for said shaft.

In testimony whereof, I have signed my name to this specification in the presence of two subscribing witnesses.

CHARLES HASKELL CLARK.

Witnesses:
JOHN S. CONSIDINE,
PHILIP T. REILLY.